United States Patent
Andersson et al.

(10) Patent No.: US 11,697,341 B2
(45) Date of Patent: Jul. 11, 2023

(54) COMBINED COOLING AND WATER BRAKING SYSTEM FOR A VEHICLE, AND A METHOD FOR COOLING A PROPULSION DEVICE OF A VEHICLE AND WATER BRAKING A PAIR OF WHEELS OF A VEHICLE

(71) Applicant: Volvo Truck Corporation, Gothenburg (SE)

(72) Inventors: Arne Andersson, Mölnlycke (SE); Staffan Lundgren, Hindås (SE)

(73) Assignee: Volvo Truck Corporation, Gothenburg (SE)

( * ) Notice: Subject to any disclaimer, the term of this patent is extended or adjusted under 35 U.S.C. 154(b) by 371 days.

(21) Appl. No.: 17/085,208

(22) Filed: Oct. 30, 2020

(65) Prior Publication Data
US 2021/0129659 A1  May 6, 2021

(30) Foreign Application Priority Data
Nov. 1, 2019   (EP) ................................ 2019/079986

(51) Int. Cl.
*B60K 11/02* (2006.01)
*H01M 10/613* (2014.01)
(Continued)

(52) U.S. Cl.
CPC ........ *B60K 11/02* (2013.01); *B60K 15/03006* (2013.01); *B60L 50/60* (2019.02);
(Continued)

(58) Field of Classification Search
CPC .............. B60K 11/02; B60K 15/03006; B60K 2001/006; B60K 2015/03315;
(Continued)

(56) References Cited

U.S. PATENT DOCUMENTS

| 6,546,899 B1 | 4/2003 | Friedrich et al. |
| 2006/0213463 A1 | 9/2006 | Wikstrom |

FOREIGN PATENT DOCUMENTS

| DE | 102013201787 A1 | 8/2014 |
| DE | 102014221073 B3 | 11/2015 |

(Continued)

OTHER PUBLICATIONS

Intention to Grant for European Patent Application No. 20203744.6, dated Nov. 2, 2022, 26 pages.
(Continued)

*Primary Examiner* — Grant Moubry
*Assistant Examiner* — Charles J Brauch
(74) *Attorney, Agent, or Firm* — Withrow & Terranova, PLLC

(57) ABSTRACT

A combined cooling and water braking system for a vehicle comprises a first water recirculation loop having a first heat exchanger configured to cool water flowing in the first water recirculation loop, the first water recirculation loop comprising a water conduit for transporting heat away from a propulsion device configured to generate a propulsion power for the vehicle. A second water recirculation loop having a second heat exchanger is configured to cool water flowing in the second water recirculation loop. A retarder is configured to be coupled to a pair of wheels of the vehicle. The second water recirculation loop may be selectively used for cooling the propulsion device and for providing water to the retarder for water braking. There is also provided a method for cooling a propulsion device of a vehicle and water braking a pair of wheels of a vehicle.

14 Claims, 4 Drawing Sheets

(51) Int. Cl.
  *H01M 10/625* (2014.01)
  *H01M 10/6568* (2014.01)
  *H01M 10/66* (2014.01)
  *H01M 8/2457* (2016.01)
  *B60L 50/60* (2019.01)
  *B60L 50/70* (2019.01)
  *B60K 15/03* (2006.01)
  *B60T 1/06* (2006.01)
  *B60T 13/10* (2006.01)
  *H01M 8/04029* (2016.01)
  *H01M 8/04701* (2016.01)

(52) U.S. Cl.
  CPC ............ *B60L 50/70* (2019.02); *B60T 1/062* (2013.01); *B60T 13/10* (2013.01); *H01M 8/04029* (2013.01); *H01M 8/04701* (2013.01); *H01M 8/2457* (2016.02); *H01M 10/613* (2015.04); *H01M 10/625* (2015.04); *H01M 10/6568* (2015.04); *H01M 10/66* (2015.04); *H01M 2220/20* (2013.01); *H01M 2250/20* (2013.01)

(58) Field of Classification Search
  CPC . B60K 2015/0638; B60L 50/60; B60L 50/70; B60T 1/062; B60T 13/10; H01M 8/04029; H01M 8/04701; H01M 8/2457; H01M 10/613; H01M 10/625; H01M 10/6568; H01M 10/66; H01M 2220/20; H01M 2250/20; F01P 7/16; F01P 2060/06
  See application file for complete search history.

(56) References Cited

FOREIGN PATENT DOCUMENTS

| | | |
|---|---|---|
| DE | 112015001161 T5 | 12/2016 |
| EP | 1123231 A1 | 8/2001 |
| EP | 1586754 A1 | 10/2005 |
| EP | 2097628 A1 | 9/2009 |
| SE | 1750482 A1 | 11/2018 |

OTHER PUBLICATIONS

International Search Report and Written Opinion for PCT/EP2019/079986, dated Jul. 3, 2020, 17 pages.

ABSTRACT# COMBINED COOLING AND WATER BRAKING SYSTEM FOR A VEHICLE, AND A METHOD FOR COOLING A PROPULSION DEVICE OF A VEHICLE AND WATER BRAKING A PAIR OF WHEELS OF A VEHICLE

This application claims priority to International application no. PCT/EP2019/079986, filed Nov. 1, 2019, the disclosure of which is incorporated herein by reference in its entirety.

TECHNICAL FIELD

The invention relates to a combined cooling and water braking system for a vehicle. The invention also relates to a vehicle comprising such a system. The invention further relates to a method for cooling a propulsion device of a vehicle and water braking a pair of wheels of a vehicle. The invention additionally relates to a computer program, a computer readable medium and a control unit related to said method.

The invention can be applied in heavy-duty vehicles, such as trucks, buses and construction equipment. Although the invention will be described with respect to a truck, the invention is not restricted to this particular vehicle, but may also be used in other vehicles such as cars.

BACKGROUND

The vehicle industry is striving to reduce $CO_2$ emissions. Various alternatives to diesel and gasoline have been developed for energizing the vehicles. One such alternative is battery electric vehicles (BEV). Another alternative is the use of hydrogen gas. The chemical energy of the hydrogen may, for example, be converted into mechanical energy in an internal combustion engine or into electric energy in fuel cells, in order to propel the vehicle.

Another environmentally friendly technology shift is using water braking instead of traditional engine braking. Water braking is also advantageous from a safety perspective. It reduces the wear of the brakes, the maintenance of which is usually costly, and it also reduces the risk of losing the brakes in, for example, long downhill slopes. A water retarder is indirectly connected to the road wheels and can be activated to brake the road wheels. The engine-cooling water may then be used as an operating medium in the water retarder. A normal truck engine may include 1000 kg of iron, providing a high thermal inertia. While water braking may work well with some types of engines, it may present a challenge if used with other types of engines having low thermal inertia (in particular if the cooling circuit does not include a motor), in which case water braking can heat up the cooling system substantially. In case of, for instance, a fuel cell vehicle, the temperature of the water will have been heated up far above the recommended fuel cell temperature limit of 80° C., and can therefore not be used for cooling the fuel cells.

It would thus be desirable to provide a combined cooling and water braking system which has less limited implementing possibilities and which may, for instance, also be implemented in connection with fuel cell vehicles.

SUMMARY

An object of the invention is to mitigate the drawbacks of the prior art. This and other object which will become apparent in the following are accomplished by a system and a method as defined in the accompanying independent claims.

According to a first aspect of the invention, the object is achieved by a combined cooling and water braking system for a vehicle, comprising:
- a first water recirculation loop having a first heat exchanger configured to cool water flowing in the first water recirculation loop, the first water recirculation loop comprising a water conduit for transporting heat away from a propulsion device configured to generate a propulsion power for the vehicle,
- a second water recirculation loop having a second heat exchanger configured to cool water flowing in the second water recirculation loop,
- a retarder configured to be coupled to a pair of wheels of the vehicle, the retarder being switchable between
  - an inactive state in which it does not affect the rotational speed of the wheels, and
  - an active state in which the retarder causes the rotational speed of the wheels to be reduced, wherein the second water recirculation loop comprises
- a first water conduit portion connecting the second heat exchanger and the retarder for enabling water braking when the retarder is in its active state, and
- a closable second water conduit portion extending from the second heat exchanger for transporting heat away from said propulsion device, wherein the system is switchable between a first mode of operation and a second mode of operation, wherein
- in the first mode of operation the retarder is in the inactive state and the second water conduit portion of the second water recirculation loop together with the water conduit of the first water recirculation loop transport heat away from said propulsion device, and
- in the second mode of operation the retarder is in the active state and the water conduit of the first water recirculation loop transports heat away from said propulsion device, whereas the second water conduit portion of the second water recirculation loop is closed, preventing water to flow from the second heat exchanger to said propulsion device.

The inventions is based on the realization that the cooling system may temporarily be split into two parts so that, e.g. in case of the need for braking during an extended time period (for instance, in long downhill slopes or in other situations when water braking should be actuated), one part may be maintained for cooling the propulsion device, while the other part is temporarily used for water braking. Thus, the inventors have realized that a closed circuit water flow passage may be configured to become partitioned into a first water recirculation loop for transporting heat away from the propulsion device, and a second water recirculation loop for passing water through a retarder for providing water braking.

By the provision of a system that may be partitioned into two separate water recirculation loops, the high temperature generated by the water braking can be kept away from the propulsion device, which may be cooled by a separate water recirculation loop. Furthermore, in normal operation, when braking is not needed, both parts of the system may be jointly used for cooling the propulsion device, thereby enabling a very good cooling capacity in normal operation of the vehicle.

From the above it is clear that the first water recirculation loop may continuously be used for cooling the propulsion device, while the second water recirculation loop may most of the time be used for cooling the propulsion device, but is thermally decoupled from the propulsion device when it is used for water braking.

According to at least one exemplary embodiment, the system may comprise a control unit configured to perform the switching between said first mode of operation and said second mode of operation. The control unit may be programmed to perform the switching as a reaction to certain input parameters, which may for instance, be an indication of a long downhill slope or of some other situation in which a long duration braking may be beneficial (for example when the battery is fully charged).

The control unit may include a microprocessor, microcontroller, programmable digital signal processor or another programmable device. The control unit may also, or instead, include an application specific integrated circuit, a programmable gate array or programmable array logic, a programmable logic device, or a digital signal processor. Where the control unit includes a programmable device such as the microprocessor, microcontroller or programmable digital signal processor mentioned above, the processor may further include computer executable code that controls operation of the programmable device.

According to at least one exemplary embodiment, the system is further operable in a third mode of operation following the second mode of operation and before returning to the first mode of operation, wherein in said third mode of operation the retarder is, or has been, switched from the active state used in the second mode of operation to the inactive state, and the second water conduit portion of the second water recirculation loop is maintained closed. This is advantageous, since the temperature of the water that has been used in water braking may be too high to be passed to the propulsion device, and therefore the second water conduit portion of the second water recirculation loop may be maintained closed during a cool-down period. This is reflected in at least one exemplary embodiment, according to which the control unit is configured to switch from the third mode of operation to the first mode of operation when the temperature of the water in the second water recirculation loop has fallen to or below a predetermined value. Suitably, the system comprises a temperature sensor for determining the temperature of the water in the second water recirculation loop. The control unit may receive temperature senor signals from the temperature sensor, and may, based on said signals, determine if the second water conduit portion should be maintained closed or may be opened.

In at least some exemplary embodiments, during said third mode of operation, the retarder may operate in a pumping mode, without providing water braking. Thus, after water braking, in the inactive state (i.e. inactive with respect to affecting the rotational speed of the wheels) the retarder may pump the heated water in said first water conduit portion of the second water recirculation loop so that the water is recirculated through the second heat exchanger for cooling. When the recirculated water has cooled down sufficiently, the system may once again operate in the first mode of operation, opening the closed second water conduit portion. In other exemplary embodiments, there may be provided a separate pump in the first water conduit portion of the second water recirculation loop for pumping the water during the third mode of operation of the system. According to at least some exemplary embodiments, there may be provided a separate pump for providing water to the retarder also in the second mode of operation of the system, i.e. when the retarder is in its water braking active state. Thus, the retarder itself does not necessarily need any pumping functionality at all, but may in exemplary embodiments rely upon a separate pump in the first water conduit portion of the second water recirculation loop. The control unit may suitably be operatively connected to control such a separate pump.

According to at least one exemplary embodiment, the area of the second heat exchanger is larger than the area of the first heat exchanger. This is advantageous since, when the retarder is in its active state, a large amount of heat is generated, and therefore a lager cooling capacity may be desirable. Thus, by using the larger heat exchanger area for cooling the water in the second water recirculation loop, the retarder may efficiently be cooled.

According to at least one exemplary embodiment, the second water recirculation loop comprises a first valve located upstream of said propulsion device, wherein said first valve is open in said first mode of operation and closed in said second mode of operation. Thus, when the first valve is closed, the second water conduit portion of the second water recirculation loop becomes closed, preventing water to flow from the second heat exchanger to the propulsion device. A valve provides an efficient means for closing off part of the second water recirculation loop.

Suitably, the control unit may be operatively connected to control the opening and closing of said first valve.

According to at least one exemplary embodiment, the second water recirculation loop comprises a second valve located downstream of said propulsion device, wherein said second valve is open in said first mode of operation and closed in said second mode of operation. The second valve may, similarly to the first valve, be operatively connected to and controlled by the control unit. Having an additional second valve, located downstream of the propulsion device, is advantageous since it reduces the risk of backflow of heated braking water to the propulsion device. This is particularly the case if the first and the second water conduit portions of the second water recirculation loop have one or more common junctions. Such common junctions are reflected in at least one exemplary embodiment.

Thus, according to at least one exemplary embodiment, the first and the second water conduit portions of the second water recirculation loop have one or more common junctions or branching points. For instance, there may be one junction (or branching point) upstream of the second heat exchanger and/or one junction (or branching point) downstream of the second heat exchanger.

In some exemplary embodiments, the first water recirculation loop may have a common junction with the second water recirculation loop, for instance downstream of the propulsion device, but upstream of the first and second heat exchangers. Alternatively or additionally there may be a junction for the two recirculation loops upstream of, or even at, the propulsion device.

The first and second heat exchangers may in at least some exemplary embodiments be connected fluidly in parallel with each other, while in other exemplary embodiments they may be connected in series.

According to a second aspect of the invention, the object is achieved by a vehicle comprising a system according to the first aspect, including any embodiments thereof.

According to at least one exemplary embodiment, said propulsion device comprises a fuel cell stack, the vehicle further comprising one or more storage tanks configured to contain hydrogen gas and to provide hydrogen gas to the fuel cell stack. By always having one heat exchanger supplying cooling water to the fuel cell stack, its temperature can be kept at an adequate level, even though the other heat exchanger may temporarily be disconnected during a water braking phase.

According to at least one exemplary embodiment, the vehicle is in the form of a truck comprising:
- a cab having a front and a rear, and further having two lateral sides interconnecting the front and the rear of the cab,
- said storage tanks, which are secured behind the rear of the cab,
- said propulsion device, and
- a wall provided behind the cab and laterally of the storage tanks, the wall having its main extension in a vertical plane, wherein said wall houses said second heat exchanger.

By reducing the extension of the storage tanks in the transverse direction of the truck, i.e. by not allowing the storage tank to reach the at least one of the lateral sides of the truck (or to be aligned with at least one of the lateral sides of the cab) a volume behind the rear of the cab is freed for other purposes. Such freed volume, having a large vertical height behind the rear of the cab, may advantageously be used for cooling purposes. Thus, a large wall comprising said second heat exchanger may be provided behind the cab, enabling the provision of large heat exchanger area which is beneficial for cooling the retarder in the second mode of operation and for cooling the fuel cell stack in the first mode of operation. Additional benefits include that the heat exchanger is easier to keep clean and to avoid dirt from clogging any airflow passages extending therethrough, than if, for instance, it would be located underneath the chassis. Hence, a more efficient heat exchanger core may be used.

According to a third aspect of the invention, the object is achieved by a method for cooling a propulsion device of a vehicle and water braking a pair of wheels of a vehicle, comprising:
- providing a first water recirculation loop having a first heat exchanger configured to cool water flowing in the first water recirculation loop, the first water recirculation loop comprising a water conduit for transporting heat away from a propulsion device configured to generate a propulsion power for the vehicle,
- coupling a retarder to a pair of wheels of the vehicle,
- providing a second water recirculation loop having a second heat exchanger configured to cool water flowing in the second water recirculation loop, the second water recirculation loop comprising
  - a first water conduit portion connecting the second heat exchanger and the retarder for enabling water braking when the retarder is in an active state, and
  - a closable second water conduit portion extending from the second heat exchanger for transporting heat away from said propulsion device, the method further comprising the steps of:
- in a first mode of operation,
  - setting or maintaining the retarder in an inactive state in which it does not affect the rotational speed of the wheels,
  - using both the first and the second water recirculation loop for transporting heat away from the propulsion device,
- in a second mode of operation,
  - setting or maintaining the retarder in an active state in which the retarder causes the rotational speed of the wheels to be reduced,
  - using only the first water recirculation loop of the first and second water recirculation loops for transporting heat away from the propulsion device.

The advantages of the method according to the third aspect, including any embodiments thereof, is largely analogous to the advantages of the system of the first aspect and the vehicle of the second aspect, including any embodiments thereof. Some exemplary embodiments are briefly presented below.

According to at least one exemplary embodiment, the method further comprises the steps of:
- in a third mode of operation, following the second mode of operation, and before returning to the first mode of operation,
  - switching the retarder from the active state of the second mode of operation to the inactive state,
  - using only the first water recirculation loop of the first and second water recirculation loops for transporting heat away from the propulsion device,
  - allowing the temperature of the water in the second water recirculation loop to fall to or below a predetermined value.

According to at least one exemplary embodiment, the method comprises returning to said first mode of operation when the temperature of the water in the second water recirculation loop has fallen to or below said predetermined value.

According to a fourth aspect of the invention, the object is achieved by a computer program comprising program code means for performing the steps of the method of the third aspect, including any embodiment thereof, when said program is run on a computer.

According to a fifth aspect of the invention, the object is achieved by a computer readable medium carrying a computer program comprising program code means for performing the steps of the method of the third aspect, including any embodiment thereof, where said program is run on a computer.

According to a sixth aspect of the invention, the object is achieved by a control unit configured to perform the steps of the method according to the third aspect, including any embodiment thereof.

Further advantages and advantageous features of the invention are disclosed in the following description and in the dependent claims.

BRIEF DESCRIPTION OF THE DRAWINGS

With reference to the appended drawings, below follows a more detailed description of embodiments of the invention cited as examples.

In the drawings.

DETAILED DESCRIPTION OF EXAMPLE EMBODIMENTS OF THE INVENTION

Figure 1:
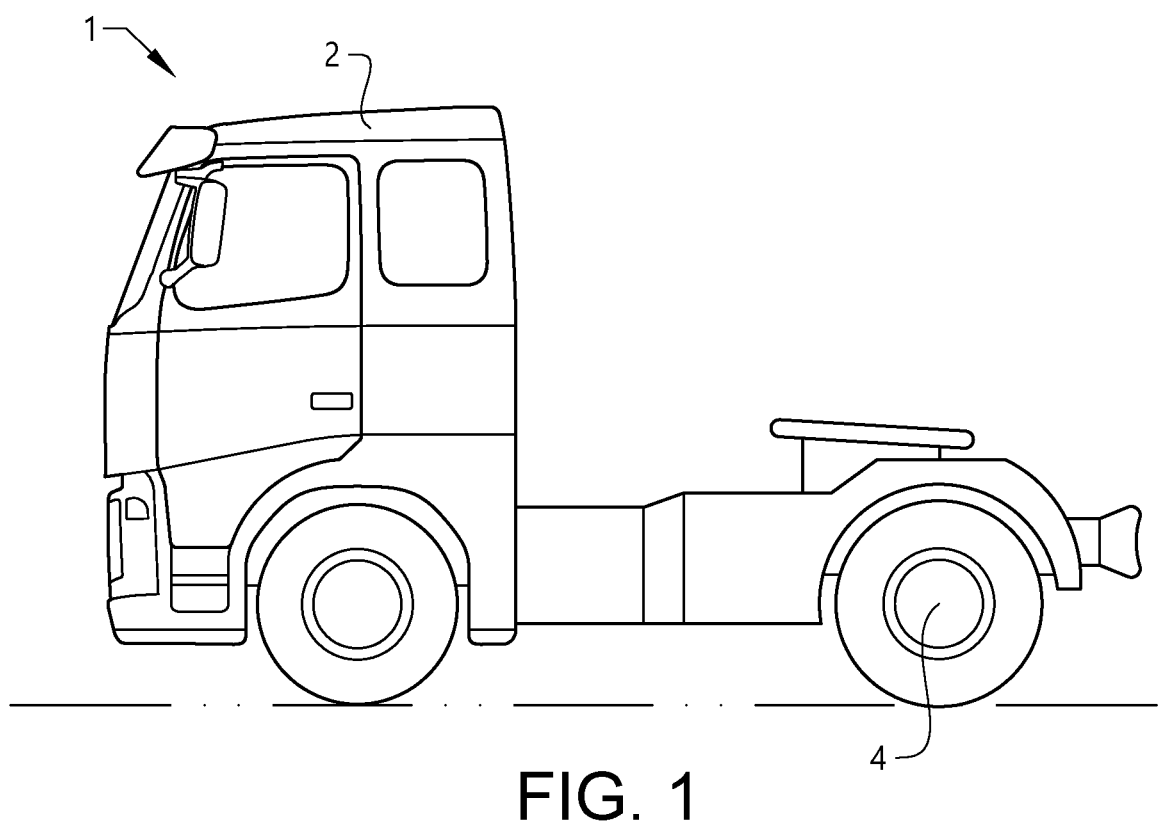
FIG. 1 illustrates a vehicle comprising a combined cooling and water braking system in accordance with at least one exemplary embodiment of the invention.

FIG. 1 illustrates a vehicle 1 comprising a combined cooling and water braking system (not shown in FIG. 1) in accordance with at least one exemplary embodiment of the invention.

Although the vehicle 1 is illustrated in the form of a truck, other types of vehicles, such as busses, construction equipment or passenger cars may be provided in accordance with the invention.

The truck (vehicle 1) comprises a cab 2 in which a driver may operate the vehicle 1. The vehicle 1 comprises a number of road wheels 4, herein illustrated as two pairs of wheels, however in other embodiments there may be a different number of wheels, such as three pairs, four pairs or more. The vehicle may have a propulsion device (not shown in FIG. 1) configured to generate a propulsion power for the vehicle. The propulsion device may for instance be an internal combustion engine, a battery-powered electric motor, or a motor powered by fuel cells.

An exemplary embodiment of the system will be described with respect to the schematic illustration of FIG. 2.

Figure 2:
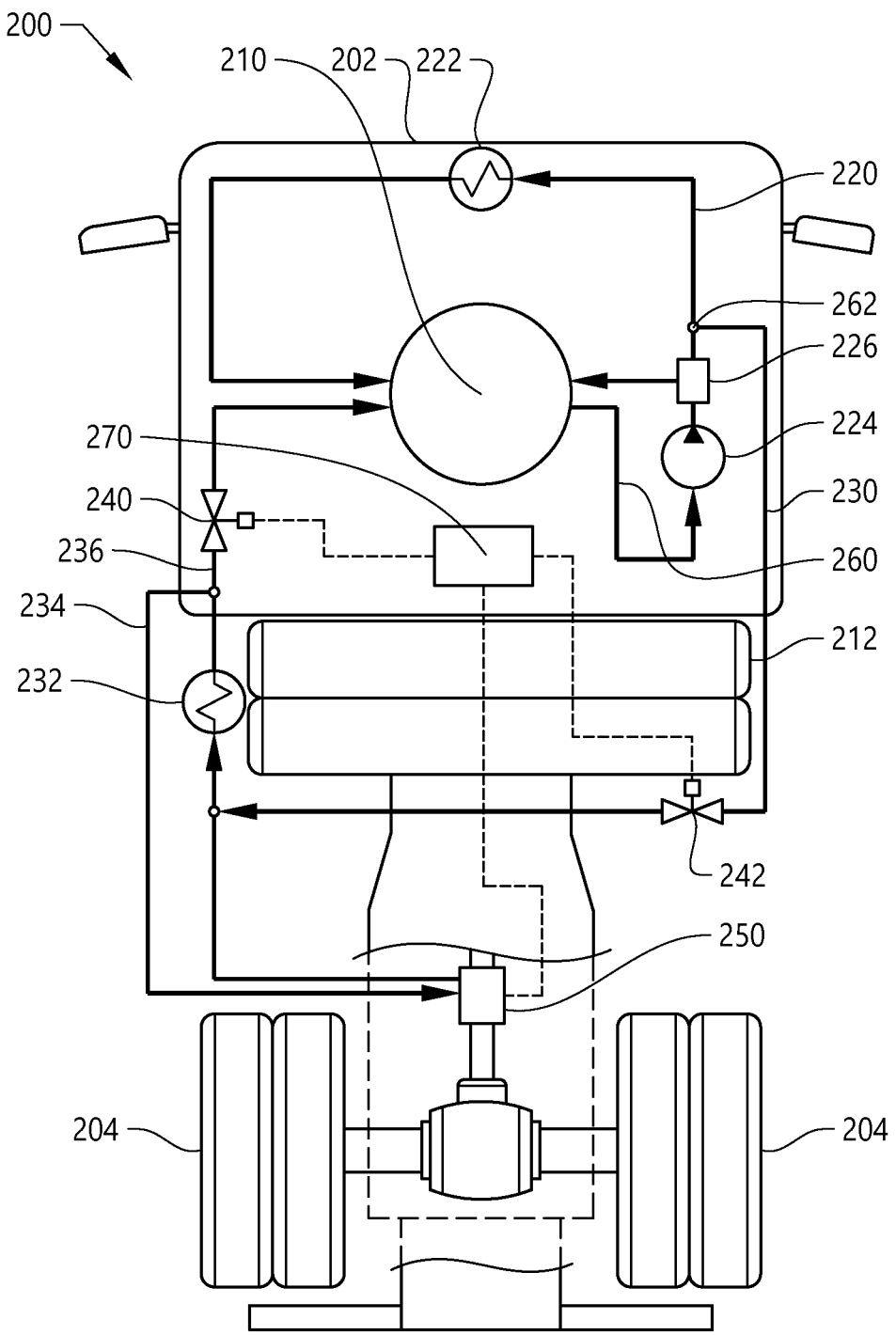
FIG. 2 schematically illustrates a combined cooling and water braking system in accordance with at least one exemplary embodiment of the invention.

Thus, FIG. 2 illustrates schematically a combined cooling and water braking system 200 in accordance with at least one exemplary embodiment of the invention. The illustration is made relative to a schematic outline of certain parts of a vehicle, however, it should be understood that the specific location of the system components may be placed differently than in the exemplary illustration. In the illustration a cab 202 of a vehicle and a pair of rear wheels 204 of the vehicle have been schematically indicated. At the cab 202, for example under the cab, there may be provided a propulsion device 210, such as comprising a stack of fuel cells 210. Behind the cab 202, there may be provided storage tanks 212 for containing hydrogen gas which may be supplied to the stack of fuel cells 210. Although not illustrated, the storage tanks 212 may suitably be held by a rack attached to the vehicle chassis.

The illustrated exemplary embodiment of the system 200 comprises a first water recirculation loop 220. The first water recirculation loop 220 has a first heat exchanger 222 which is configured to cool water flowing in the first water recirculation loop 220. The first water recirculation loop 220 comprises a water conduit for transporting heat away from the propulsion device 210 (stack of fuel cells). A pump 224 is provided to pump water that has taken up heat from the propulsion device 210. Downstream of the pump 224 there may be provided a thermostat 226 which senses the temperature of the water in the conduit and if the temperature is above a predefined value the water is led to the first heat exchanger 222 to be cooled down before returning to the propulsion device 210. If the thermostat 226 determines that the temperature of the water is still low enough, it may be returned to propulsion device 210 without being led through the first heat exchanger 222.

The illustrated exemplary embodiment of the system 200 also comprises a second water recirculation loop 230. The second water recirculation loop 230 has a second heat exchanger 232 configured to cool water flowing in the second water recirculation loop 230.

Before going into the details of the second water recirculation loop 230, it should be noticed that the illustrated exemplary embodiment of the system 200 also comprises a retarder 250. The retarder 250 is configured to be coupled the pair of rear wheels 204 of the vehicle. The retarder 250 is switchable between an inactive state and an active state. In the inactive state the retarder 250 does not affect the rotation speed of the wheels 204. In the active state the retarder 250 causes the rotational speed of the wheels 204 to be reduced.

Turning back to the details of the second water recirculation loop 230, it comprises a first water conduit portion 234 and a second water conduit portion 236. The first water conduit portion 234 connects the second heat exchanger 232 and the retarder 250 for enabling water braking when the retarder 250 is in its active state. The second water conduit portion 236 extends from the second heat exchanger 232 for transporting heat away from the propulsion device 210. The second water conduit portion 236 may be closed, for instance by means of a first valve 240. The second water conduit portion 236 may suitably also be closed by means of a second valve 242. The first valve 240 is located downstream of the second heat exchanger 232 and upstream of the propulsion device 210. The second valve 242 is located downstream of the propulsion device 210 and upstream of the second heat exchanger 232.

The system 200 is switchable between a first mode of operation and a second mode of operation. In the first mode of operation the retarder 250 is in the inactive state and the second water conduit portion 236 of the second water recirculation loop 230 together with the water conduit of the first water recirculation loop 220 transport heat away from the propulsion device 210. Thus, in the illustrated exemplary embodiment, the first and the second valves 240, 242 are open to allow the water to recirculate via the second heat exchanger 232 to the propulsion device 210. As illustrated in FIG. 2, the first and the second water recirculation loops 220, 230 may have a common section 260 from the propulsion device 210 to the thermostat 226 and then downstream of the thermostat 226 be divided into two separate sections at a branching point 262. However, in other exemplary embodiments, the first and the second water recirculation loops may exit as separate sections from the propulsion device and two separate pumps and thermostats may be provided for the respective recirculation loop.

In the second mode of operation, the retarder 250 is in the active state and the water conduit of the first water recirculation loop 220 transports heat away from the propulsion device 210, whereas the second water conduit portion 236 of the second water recirculation loop 230 is closed, preventing water to flow from the second heat exchanger 232 to the propulsion device 210. Thus, in the second mode of operation the first valve 240 is closed. Suitably, in the illustrated exemplary embodiment, the second valve 242 is also closed, so as to avoid losing water from the first water recirculation loop 220 to the second water recirculation loop 230.

Suitably, the system 200 may comprise a control unit 270 configured to perform the switching between said first mode of operation and said second mode of operation. The control unit 270 may thus be operatively connected to the first valve 240, the second valve 242 and the retarder 250, in order to control the opening and closing of the first and second valves 240, 242, and the activating and inactivating of the retarder 250. In addition to controlling the just mentioned components, the control unit 270 may suitably be operatively connected to control and/or communicate with other components as well, such as for instance the pump 224 and/or the thermostat 226.

The control unit 270 may comprise or may be comprised in a processing circuitry. The processing circuitry may include a microprocessor, microcontroller, programmable digital signal processor or another programmable device. The processing circuitry may also, or instead, include an application specific integrated circuit, a programmable gate array or programmable array logic, a programmable logic device, or a digital signal processor. Where the processing circuitry includes a programmable device such as the microprocessor, microcontroller or programmable digital signal processor mentioned above, the processor may further include computer executable code that controls operation of the programmable device. It should be understood that all or some parts of the functionality provided by means of the processing circuitry may be at least partly integrated with the control unit 270.

Because the temporary water braking (i.e. the second mode of operation) causes a strong rise in temperature of the water in the first water conduit portion 234 of the second recirculation loop 230, it may be recommendable to postpone the opening of the second water conduit portion 236 of the second recirculation loop 230 until the temperature has fallen sufficiently to be able to once again be used for cooling the propulsion device 210. Therefore, the system 200 may suitably be further operable in a third mode of operation, which is an intermediate mode of operation before switching back from the second mode of operation to the first mode of operation. In the third mode of operation, the retarder 250 is, or has been, switched from the active state (used in the second mode of operation) to the inactive state, and the second water conduit portion 236 of the second water recirculation loop 230 is maintained closed. Thus, the second heat exchanger 232 is allowed to cool down the high temperature water circulating in the first water conduit portion 234 before the second water conduit portion 236 is opened again (and thus before the first valve 240 and the second valve 242 are opened again in FIG. 2).

The control unit 270 may be configured to switch from the third mode of operation when the temperature of the water in the second water recirculation loop 230, in particular in the first water conduit portion 234, has fallen to or below a predetermined value. Suitably, a temperature sensor (not shown) may be provided in the first water conduit portion 234, and such a temperature sensor may suitably be operatively connected to the control unit 270.

In at least some exemplary embodiments, during said third mode of operation, the retarder 250 may operate in a pumping mode, without providing water braking. Thus, after water braking, in the inactive state (i.e. inactive with respect to affecting the rotational speed of the wheels) the retarder 250 may pump the heated water in said first water conduit portion 234 of the second water recirculation loop 230 so that the water is recirculated through the second heat exchanger 232 for cooling. When the recirculated water has cooled down sufficiently, the system 200 may once again operate in the first mode of operation, opening the closed second water conduit portion 236. In other exemplary embodiments, there may be provided a separate pump (not illustrated) in the first water conduit portion 234 of the second water recirculation loop 230 for pumping the water during the third mode of operation of the system. According to at least some exemplary embodiments, there may be provided a separate pump for providing water to the retarder 250 also in the second mode of operation of the system 200, i.e. when the retarder 250 is in its water braking active state. Thus, the retarder 250 itself does not necessarily need any pumping functionality at all, but may in exemplary embodiments rely upon a separate pump in 5 the first water conduit portion 234 of the second water recirculation loop 230. The control unit 270 may suitably be operatively connected to control such a separate pump.

To efficiently cool down the water in the first water conduit portion 234 after water braking, it is advantageous if the second heat exchanger 232 has a large heat exchanger area. For example, the area of the second heat exchanger 232 may suitably be larger than the area of the first heat exchanger 222. It has been found that an advantageous way to provide for a large heat exchanger area is by utilizing the space behind the cab 202 of the truck. This will now be discussed in connection with FIGS. 3a and 3b.

Figure 3A:
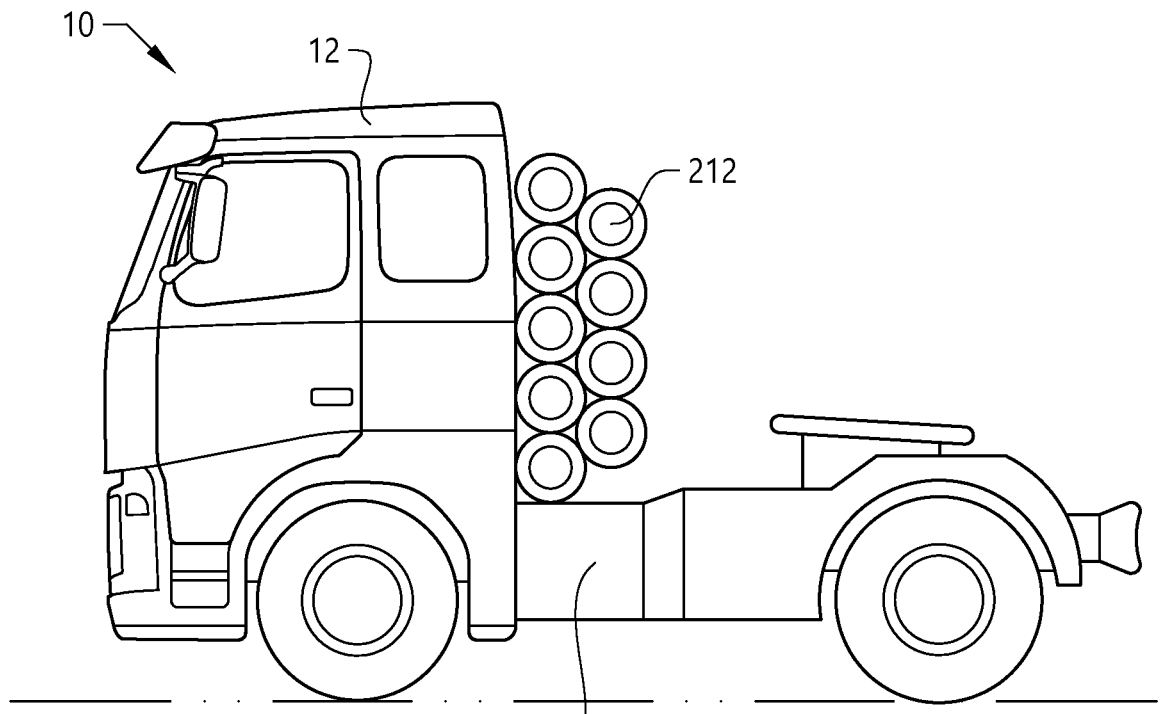
FIG. 3a illustrates a vehicle provided with a plurality of storage tanks.
Figure 3B:
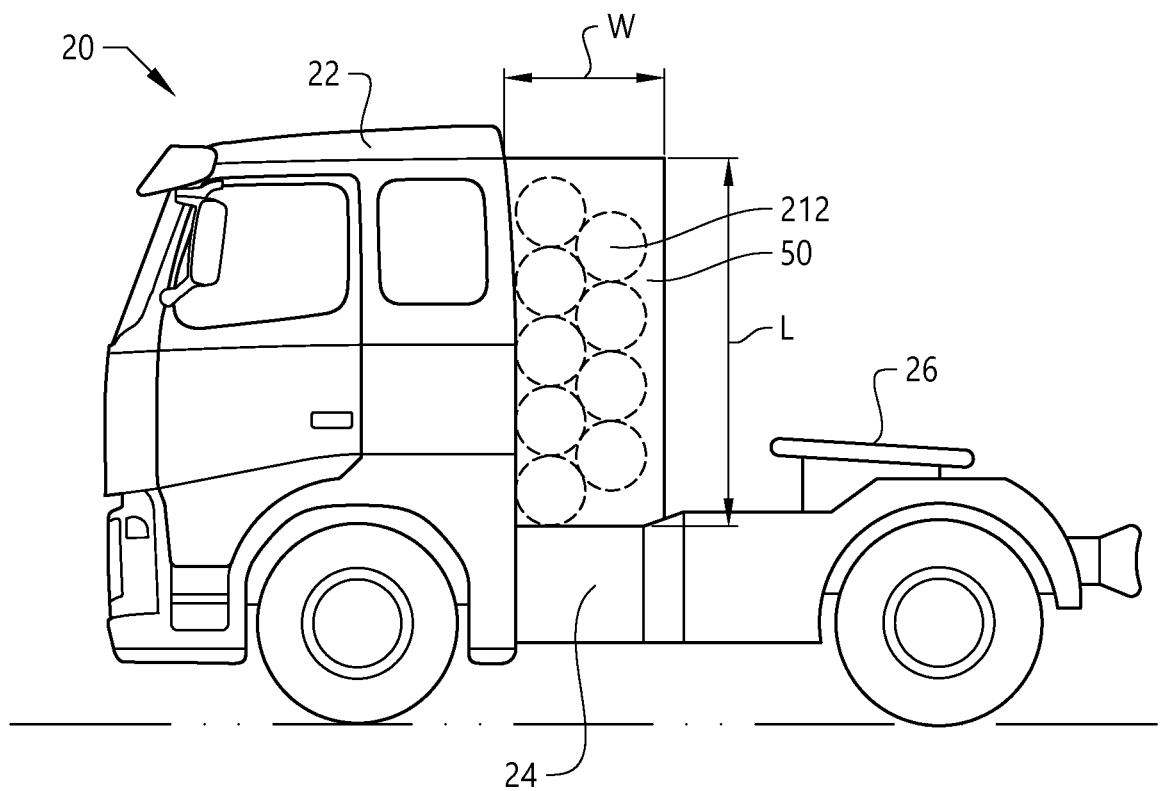
FIG. 3b illustrates a wall provided laterally of the storage tanks of FIG. 3a, wherein the wall houses a part of the combined cooling and water braking system according to at least one exemplary embodiment of the invention.

FIG. 3a illustrates a vehicle 10 provided with a plurality of storage tanks 212. The storage tanks 212 may suitable be held by a rack (not illustrated) attached to the chassis 14 of the vehicle 10. The storage tanks 212 may contain hydrogen gas which may be supplied to a fuel cell stack of the vehicle 10. Providing such storage tanks 212 behind the cab 12 of the vehicle 10 is known per se. However, the utilization of the space behind the cab 12 for cooling purposes is not known. As illustrated in FIG. 3b, a vehicle 20 comprises a cab 22, and according to at least one exemplary embodiment of the invention, a wall 50 may be provided laterally of the storage tanks 212, wherein the wall 50 may have a hollow interior housing a part of the combined cooling and water braking system 200 shown in FIG. 2. In particular, the wall 50 may house the second heat exchanger 232. The wall 50 has its main extension in a vertical plane (i.e. the plane of the drawing).

Although FIG. 3b is a side view, it should be understood that there may be a corresponding second wall on the other lateral side of the storage tanks 212, also behind the rear of the cab 22. Such a second wall may house another part of the cooling and water braking system, for example a third heat exchanger. In the following discussion, reference will only be made to the wall 50 shown in FIG. 3b. However, it should be understood that the features discussed in relation to the wall 50, may be equally applicable to the above mentioned second wall in embodiments having such a second wall.

The wall 50 has a length L, a width W, a thickness T, wherein the length is greater than the width and the width is greater than the thickness. In other words L>W>I As illustrated in FIG. 3b, since there is no upper obstacle on the truck, the length L of the wall 50 may suitably extend in the vertical direction of the vehicle 20 (also referred to as the yaw direction). The width W of the wall 50 may extend in the longitudinal direction of the truck (also referred to as the roll direction). The thickness T (not shown in FIG. 3b) of the wall 50 may thus extend in the transverse direction of the truck (also referred to as the pitch direction), i.e. perpendicularly to the plane of the drawing.

The wall 50 has an inboard side facing the storage tanks 212, and an oppositely facing outboard side. Suitably, the outboard side may form a continuation of one of the lateral sides of the cab 22. Thus, the outboard side of the wall 50 may suitably be aligned with the lateral side of the cab 22 and form part of the aerodynamic kit of the vehicle 20. The wall 50 is hollow, such that between the inboard side and the outboard side of the wall 50, there is a space for the second heat exchanger.

The wall 50 may be directly or indirectly mounted on the chassis 24. For instance, there may be provided a rack for holding the storage tanks 212 and the rack may be attached to the chassis 24. The wall 50 may in such case suitably be mounted to the rack.

The thickness of the wall 50 may be in the range of 50-300 mm, such as in the range of 60-200 mm, for example in the range of 80-120 mm. For instance, from the inboard side to the outboard side, the wall 50 may span approximately 100 mm, leaving plenty of space in the transverse direction for the storage tanks 212. As mentioned above, the hollow wall 50 may house the second heat exchanger. The large area available for the wall 50, and inside the wall 50, is particularly suitable for that purpose. The core of a heat exchanger may be very thin, such as 30-100 mm, which may be held by a thicker frame. Fans may also fit inside the thin wall 50. Thus, the thin wall 50 combined with the large available heat exchanger area, is beneficial for creating an efficient cooling, without any substantial compromising on the size of the storage tanks 212. It may be conceivable that, in some exemplary embodiments, some components protrude out from the wall 50 on the inboard side. For instance, one or more motors that power one or more fans of a heat exchanger may protrude out from the wall 50, and even a portion of such fans may in some exemplary embodiments protrude out from the wall 50.

The wall 50 may suitably comprise one or more energy absorbing structures forming collision protection for the storage tanks 212. For instance, the hollow wall 50 may comprise deformable material which absorbs at least a part of the energy at an impact, so that a reduced amount, or none, of the impact energy reaches the storage tanks 212. Accordingly, the hollow, heat exchanger containing wall 50 has multiple benefits. In addition to providing a large accessible area for efficient cooling, it may also improve the aerodynamic characteristics of the vehicle 20 as well as providing collision protection.

The vehicle 20 comprises a connector 26 for connecting and towing a trailer. The wall 50 may thus be configured to extend between the rear of the cab 22 and a towed trailer. Suitably, the cab 22, the wall 50 and the towed trailer may form a substantially continuous contour, with only minor gaps in between, improving the aerodynamic characteristics of the complete combined vehicle.

Figure 4:
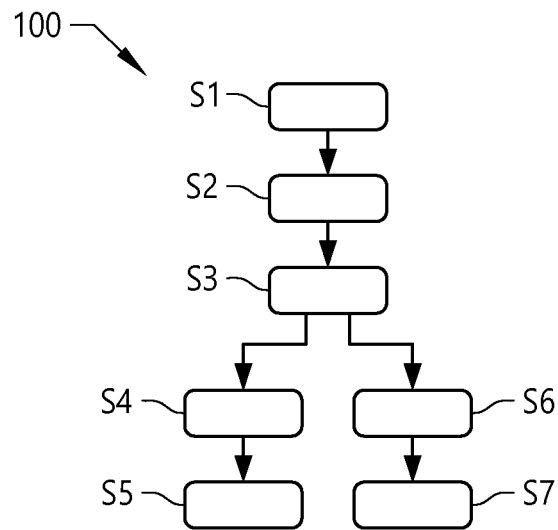
FIG. 4 illustrates a method of the invention in accordance with at least one exemplary embodiment of the invention.

FIG. 4 illustrates a method 100 of the invention in accordance with at least one exemplary embodiment of the invention. Thus, there is provided a method 100 for cooling a propulsion device of a vehicle and water braking a pair of wheels of a vehicle, comprising:
in a step S1, providing a first water recirculation loop having a first heat exchanger configured to cool water flowing in the first water recirculation loop, the first water recirculation loop comprising a water conduit for transporting heat away from a propulsion device configured to generate a propulsion power for the vehicle,
in a step S2, coupling a retarder to a pair of wheels of the vehicle,
in a step S3, providing a second water recirculation loop having a second heat exchanger configured to cool water flowing in the second water recirculation loop, the second water recirculation loop comprising
a first water conduit portion connecting the second heat exchanger and the retarder for enabling water braking when the retarder is in an active state, and
a closable second water conduit portion extending form the second heat exchanger for transporting heat away from said propulsion device, the method (100) further comprising:
in a first mode of operation,
in a step S4, setting or maintaining the retarder in an inactive state in which it does not affect the rotational speed of the wheels,
in a step S5, using both the first and the second water recirculation loop for transporting heat away from the propulsion device,
in a second mode of operation,
in a step S6, setting or maintaining the retarder in an active state in which the retarder causes the rotational speed of the wheels to be reduced,
in a step S7, using only the first water recirculation loop of the first and second water recirculation loops for transporting heat away from the propulsion device.

Figure 5:
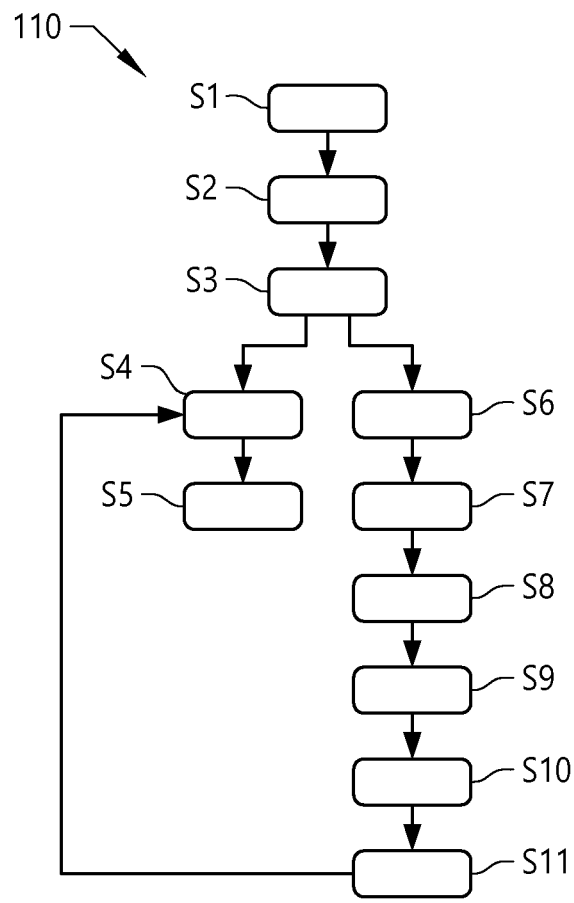
FIG. 5 illustrates a method of the invention in accordance with at least another exemplary embodiment of the invention.

FIG. 5 illustrates a method 110 in accordance with at least another exemplary embodiment of the invention. In addition to the steps S1-S7 of the method 100 in FIG. 4, the method 110 in FIG. 5 also comprises the following steps:
in a third mode of operation, following the second mode of operation, and before returning to the first mode of operation,
in a step S8, switching the retarder from the active state of the second mode of operation to the inactive state,
in a step S9, using only the first water recirculation loop of the first and second water recirculation loops for transporting heat away from the propulsion device,
in a step 510, allowing the temperature of the water in the second water recirculation loop to fall to or below a predetermined value.

The method 110 may also comprise:
in a step S11, returning to said first mode of operation when the temperature of the water in the second water recirculation loop has fallen to or below said predetermined value.

It should be understood that the steps S1-S7 in the method 100 of FIG. 4 and the steps S1-S11 in the method of FIG. 5 do not necessarily need to be performed in chronological order. For instance, steps S1-S3 may be performed in any order or simultaneously with each other. Similarly, steps S6 and S7 may be performed in any order or simultaneously.

It is to be understood that the present invention is not limited to the embodiments described above and illustrated in the drawings; rather, the skilled person will recognize that many changes and modifications may be made within the scope of the appended claims.

For instance, although FIG. 2 only illustrates one first heat exchanger 222 and one second heat exchanger 232, it would be conceivable to have a plurality of first heat exchangers and/or a plurality of second heat exchangers. Also, although the heat exchangers have been illustrated as arranged fluidly in parallel with each other, in other exemplary embodiments they could be arranged in series from a fluid flow perspective. Likewise, the provision of valves and the number of valves may be varied according to the arrangement and layout of the first and second recirculation loops 220, 230. Regardless of the above mentioned variations and possibilities in other exemplary embodiments, they all have in common that two water recirculation loops may be used to transport heat away from the propulsion device 210 in normal operating conditions (first operating mode), and when water braking is required, one of the recirculation loops is disconnected from transporting heat away from the propulsion device 210 and the water in the so disconnected recirculation loop is instead used in the retarder 250 for water braking and thus reducing the speed of wheels 204 to which the retarder 250 is operatively coupled.

The invention claimed is:

1. A combined cooling and water braking system for a vehicle, comprising:
a first water recirculation loop having a first heat exchanger configured to cool water flowing in the first water recirculation loop, the first water recirculation loop comprising a water conduit for transporting heat away from a propulsion device configured to generate a propulsion power for the vehicle;
a second water recirculation loop having a second heat exchanger configured to cool water flowing in the second water recirculation loop; and
a retarder configured to be coupled to a pair of wheels of the vehicle, the retarder being switchable between:
an inactive state in which it does not affect the rotational speed of the wheels; and
an active state in which the retarder causes the rotational speed of the wheels to be reduced,
wherein the second water recirculation loop comprises:
a first water conduit portion connecting the second heat exchanger and the retarder for enabling water braking when the retarder is in its active state; and
a closable second water conduit portion extending from the second heat exchanger for transporting heat away from the propulsion device,
wherein the system is switchable between a first mode of operation and a second mode of operation, wherein:
in the first mode of operation the retarder is in the inactive state and the second water conduit portion of the second water recirculation loop together with the water conduit of the first water recirculation loop transport heat away from the propulsion device; and
in the second mode of operation the retarder is in the active state and the water conduit of the first water recirculation loop transports heat away from the propulsion device, whereas the second water conduit portion of the second water recirculation loop is closed, preventing water to flow from the second heat exchanger to the propulsion device.

2. The system of claim 1, comprising a control unit configured to perform the switching between the first mode of operation and the second mode of operation.

3. The system of claim 2, wherein the system is further operable in a third mode of operation following the second mode of operation and before returning to the first mode of operation, wherein in the third mode of operation the retarder is, or has been, switched from the active state used in the second mode of operation to the inactive state, and the second water conduit portion of the second water recirculation loop is maintained closed.

4. The system of claim 3, wherein the control unit is configured to switch from the third mode of operation to the first mode of operation when the temperature of the water in the second water recirculation loop has fallen to or below a predetermined value.

5. The system of claim 1, wherein the area of the second heat exchanger is larger than the area of the first heat exchanger.

6. The system of claim 1, wherein the second water recirculation loop comprises a first valve located upstream of the propulsion device, wherein the first valve is open in the first mode of operation and closed in the second mode of operation.

7. The system of claim 6, wherein the second water recirculation loop comprises a second valve located downstream of the propulsion device, wherein the second valve is open in the first mode of operation and closed in the second mode of operation.

8. A vehicle comprising a combined cooling and water braking system for a vehicle, the system comprising:
a first water recirculation loop having a first heat exchanger configured to cool water flowing in the first water recirculation loop, the first water recirculation loop comprising a water conduit for transporting heat away from a propulsion device configured to generate a propulsion power for the vehicle;
a second water recirculation loop having a second heat exchanger configured to cool water flowing in the second water recirculation loop; and
a retarder configured to be coupled to a pair of wheels of the vehicle, the retarder being switchable between:
an inactive state in which it does not affect the rotational speed of the wheels; and
an active state in which the retarder causes the rotational speed of the wheels to be reduced,
wherein the second water recirculation loop comprises:
a first water conduit portion connecting the second heat exchanger and the retarder for enabling water braking when the retarder is in its active state; and
a closable second water conduit portion extending from the second heat exchanger for transporting heat away from the propulsion device,
wherein the system is switchable between a first mode of operation and a second mode of operation, wherein:
in the first mode of operation the retarder is in the inactive state and the second water conduit portion of the second water recirculation loop together with the water conduit of the first water recirculation loop transport heat away from the propulsion device; and
in the second mode of operation the retarder is in the active state and the water conduit of the first water recirculation loop transports heat away from the propulsion device, whereas the second water conduit portion of the second water recirculation loop is closed, preventing water to flow from the second heat exchanger to the propulsion device.

9. The vehicle according to claim 8, wherein the propulsion device comprises a fuel cell stack, the vehicle further comprising one or more storage tanks configured to contain hydrogen gas and to provide hydrogen gas to the fuel cell stack.

10. The vehicle according to claim 9, wherein the vehicle is a truck comprising:
a cab having a front and a rear, and further having two lateral sides interconnecting the front and the rear of the cab;
the storage tanks, which are secured behind the rear of the cab;
the propulsion device; and
a wall provided behind the cab and laterally of the storage tanks, the wall having its main extension in a vertical plane, wherein the wall houses the second heat exchanger.

11. The vehicle according to claim 8, wherein the propulsion device is a battery-powered electric motor.

12. A method for cooling a propulsion device of a vehicle and water braking a pair of wheels of a vehicle, comprising:
providing a first water recirculation loop having a first heat exchanger configured to cool water flowing in the first water recirculation loop, the first water recirculation loop comprising a water conduit for transporting heat away from a propulsion device configured to generate a propulsion power for the vehicle;

coupling a retarder to a pair of wheels of the vehicle; and providing a second water recirculation loop having a second heat exchanger configured to cool water flowing in the second water recirculation loop, the second water recirculation loop comprising:
- a first water conduit portion connecting the second heat exchanger and the retarder for enabling water braking when the retarder is in an active state; and
- a closable second water conduit portion extending from the second heat exchanger for transporting heat away from the propulsion device, in a first mode of operation, setting or maintaining the retarder in an inactive state in which it does not affect the rotational speed of the wheels;

in the first mode of operation, using both the first and the second water recirculation loop for transporting heat away from the propulsion device, in a second mode of operation, setting or maintaining the retarder in an active state in which the retarder causes the rotational speed of the wheels to be reduced; and in the second mode of operation, using only the first water recirculation loop of the first and second water recirculation loops for transporting heat away from the propulsion device.

13. The method according to claim 12, further comprising:
in a third mode of operation, following the second mode of operation, and before returning to the first mode of operation:
- switching the retarder from the active state of the second mode of operation to the inactive state;
- using only the first water recirculation loop of the first and second water recirculation loops for transporting heat away from the propulsion device; and
- allowing the temperature of the water in the second water recirculation loop to fall to or below a predetermined value.

14. The method according to claim 13, comprising returning to the first mode of operation when the temperature of the water in the second water recirculation loop has fallen to or below the predetermined value.

* * * * *